US008088462B1

(12) United States Patent
Cockman et al.

(10) Patent No.: US 8,088,462 B1
(45) Date of Patent: Jan. 3, 2012

(54) PROTECTIVE FILM SYSTEMS AND KITS FOR VEHICULAR WINDOWS AND WINDOW ASSEMBLIES AND METHODS USING THE SAME

(75) Inventors: Tonya M. Cockman, Greensboro, NC (US); Patrick Haden Jennings, Greensboro, NC (US); Donald C. Martin, Martinsville, VA (US)

(73) Assignee: Clear Defense LLC, Greensboro, NC (US)

( * ) Notice: Subject to any disclaimer, the term of this patent is extended or adjusted under 35 U.S.C. 154(b) by 622 days.

(21) Appl. No.: 12/251,739

(22) Filed: Oct. 15, 2008

Related U.S. Application Data

(60) Provisional application No. 60/999,082, filed on Oct. 16, 2007, provisional application No. 60/984,913, filed on Nov. 2, 2007.

(51) Int. Cl.
*B32B 9/00* (2006.01)
*B32B 33/00* (2006.01)
*B60J 11/08* (2006.01)

(52) U.S. Cl. ............ 428/40.1; 428/42.2; 296/95.1; 296/136.02; 296/146.1; 150/166; 150/168; 160/370.21

(58) Field of Classification Search .......... 428/40.1, 428/41.7, 41.8, 42.2, 343, 352, 354; 359/642; 296/84.1, 95.1, 136.02, 146.1; 150/166, 150/168; 160/370.21; 156/297, 299
See application file for complete search history.

(56) References Cited

U.S. PATENT DOCUMENTS

| | | | |
|---|---|---|---|
| 2,511,329 A | 6/1950 | Craig | |
| 3,388,032 A | 6/1968 | Saunders | |
| 3,499,783 A | 3/1970 | Nelson et al. | |
| 4,716,601 A | 1/1988 | McNeal | |
| 4,983,461 A | 1/1991 | Daude et al. | |
| 5,002,326 A | 3/1991 | Westfield et al. | |
| 5,368,904 A | 11/1994 | Stephinson | |
| 5,645,940 A | 7/1997 | Teddington, Jr. et al. | |
| 5,740,560 A | 4/1998 | Muoio | |
| 5,820,201 A * | 10/1998 | Jabalee | 296/136.02 |
| 5,902,198 A | 5/1999 | Martin et al. | |
| 6,085,358 A | 7/2000 | Cogan | |
| 6,224,976 B1 | 5/2001 | Takushima et al. | |
| 6,388,813 B1 | 5/2002 | Wilson et al. | |
| 6,461,709 B1 | 10/2002 | Janssen et al. | |
| 6,536,045 B1 | 3/2003 | Wilson et al. | |
| 6,817,952 B2 * | 11/2004 | Martin et al. | 472/92 |
| 6,870,686 B2 | 3/2005 | Wilson et al. | |
| 7,370,903 B2 * | 5/2008 | Barbee et al. | 296/95.1 |

OTHER PUBLICATIONS

Force Protection Industries, Inc. Brochure "Buffalo—Mine-Protected Clearance Vehicles", 2 pages, www.forceprotection.net (Date unknown).

(Continued)

*Primary Examiner* — Patricia Nordmeyer
(74) *Attorney, Agent, or Firm* — Myers Bigel Sibley & Sajovec, PA

(57) ABSTRACT

A vehicular window assembly includes a vehicular window, an inner film unit and an outer film unit. The vehicular window panel has interior and exterior opposed surfaces. The inner film unit includes an inner adhesive layer and an inner film layer adhered to the interior surface of the vehicular window panel by the inner adhesive layer. The outer film unit includes an outer adhesive layer and an outer film layer adhered to the exterior surface of the vehicular window panel by the outer adhesive layer.

8 Claims, 11 Drawing Sheets

OTHER PUBLICATIONS

Force Protection Industries, Inc. Brochure, "Cougar Series (4x4)—Medium Mine-Protected Vehicles", 2 pages, www.forceprotection.net (Date unknown).

Force Protection Industries, Inc. Brochure, "Cougar Series (6x6)—Medium Mine-Protected Vehicles", 2 pages, www.forceprotection.net (Date unknown).

Force Protection Industries, Inc. Brochure, "Cheetah: Cheetah First Response—Protected and Fast", 2 pages, www.forceprotection.net (Date unknown).

"Profile: Force Protection, Inc.—Armored Forces", US Industry Today, 9:4, 8 pages (2006).

"Racing Optics: WindshieldStack Tearoffs", Cole Motorsports, one page, http://www.colemotorsports.com/index.cfm?form_cat_id=13&action=category, Last Downloaded: Jan. 31, 2009.

"CM Racing Products: Windsheild Installation Kit", Cole Motorsports, one page, http://www.colemotorsports.com/index.cfm?form_cat_id=19.13.7&action=category, Last Downloaded: Jan. 31, 2009.

"Racing Optics: WindshieldProtect Single Layer Applications", Cole Motorsports, one page, http://www.colemotorsports.com/index.cfm?form_cat_id=18,13,7&action=category, Last Downloaded: Jan. 31, 2009.

"WindshieldProtect Single Layer Nascar Nextel Cup/BUSCH/Craftsman Truck/ABC Body and ARCA Applications", Cole Motorsports, one page, http://www.colemotorsports.com/index.cfm?form_cat_ id=33,18.13,7&action=category, Last Downloaded: Jan. 31, 2009.

"Single Layer Protector Full Windshield (Car)", Cole Motorsports, one page, http://www.colemotorsports.com/index.cfm?tpc=Single_Layer_Protector_Full_Windshield, Last Downloaded: Jan. 31, 2009.

"WindshieldProtect Single Layer Sportscar Applications", Cole Motorsports, one page, http://www.colemotorsports.com/index.cfm?form_cat_ id=36,18,13,7&action=category, Last Downloaded: Jan. 31, 2009.

"Racing Optics: WindshieldStack2 Tearoff Applications", Cole Motorsports, one page, http://www.colemotorsports.com/index.cfm?form_cat_id=15,13,7&action=category, Downloaded: Jan. 31, 2009.

"WindshieldStack2 Nascar A-B-C Body Application", Cole Motorsports, one page, http://www.colemotorsports.com/index.cfm?form_cat_id=29,15,13,7&action=category, Last Downloaded: Jan. 31, 2009.

"WindshieldStack2 Sportscar Applications", Cole Motorsports, one page, http://www.colemotorsports.com/index.cfm?form_cat_id=28,15,13,7&action=category, Last Downloaded: Jan. 31, 2009.

"Racing Optics: WindshieldStack4 Tearoff Applications", Cole Motorsports, one page, http://www.colemotorsports.com/index.cfm?form_cat_id=20,13,7&action=category, Last Downloaded: Jan. 31, 2009.

"WindshieldStack4 Nascar Craftsman Truck Applications", Cole Motorsports, one page, http://www.colemotorsports.com/index.cfm?form_cat_id =24,20,13,7&action=category, Last Downloaded: Jan. 31, 2009.

"WindshieldStack4 Sportscar Applications", Cole Motorsports, one page, http://www.colemotorsports.com/index.cfm?form_cat_id=37,20,13,7&action=category, Last Downloaded: Jan. 31, 2009.

"Racing Optics—Cole Motorsports WindshieldStack4™ Installation Procedures", Cole Motorsports, LLC, 4 pages, (Date Unknown).

* cited by examiner

PROTECTIVE FILM SYSTEMS AND KITS FOR VEHICULAR WINDOWS AND WINDOW ASSEMBLIES AND METHODS USING THE SAME

RELATED APPLICATION(S)

The present application claims the benefit of and priority to U.S. Provisional Patent Application No. 60/999,082, filed Oct. 16, 2007, and U.S. Provisional Patent Application No. 60/984,913, filed Nov. 2, 2007, the disclosures of which are incorporated herein by reference in their entireties.

FIELD OF THE INVENTION

The present invention relates to systems and methods for protecting vehicles and, more particularly, to systems and methods for protecting vehicular windows.

BACKGROUND OF THE INVENTION

The windows of vehicles such as tactical or military vehicles may be subjected to explosive forces and impacts with debris, shrapnel and other objects. Such impacts may damage or abrade the windows, thereby degrading their transparency and/or compromising their integrity. Moreover, when a window is broken by an impact or explosion, occupants of the vehicle may be injured by debris from the window.

SUMMARY OF THE INVENTION

According to embodiments of the present invention, a vehicular window assembly includes a vehicular window, an inner film unit and an outer film unit. The vehicular window panel has interior and exterior opposed surfaces. The inner film unit includes an inner adhesive layer and an inner film layer adhered to the interior surface of the vehicular window panel by the inner adhesive layer. The outer film unit includes an outer adhesive layer and an outer film layer adhered to the exterior surface of the vehicular window panel by the outer adhesive layer.

According to some embodiments, the vehicular window panel is mounted in a window opening of a vehicle and the inner and outer film layers are each substantially coextensive with the window opening.

In some embodiments, the interior surface of the vehicular window panel is formed of polycarbonate, and the inner adhesive layer is a polycarbonate friendly adhesive.

In some embodiments, the interior surface of the vehicular window panel is formed of polycarbonate, and the exterior surface of the vehicular window panel is formed of glass.

The vehicular window panel may form a part of a military vehicle.

The vehicular window assembly can include a second outer film unit including a second outer adhesive layer and a second outer film layer adhered to the first outer film layer by the second outer adhesive layer and selectively removable from the vehicular window panel by peeling the second outer film layer away from the first outer film layer. The second outer film layer may include a main section configured to cover the vehicular window panel and a pull tab integrally formed with the main section. In some embodiments, the vehicular window assembly includes a scratch resistant coating on the first outer film layer between the first outer film layer and the second outer adhesive layer.

According to some embodiments, the inner film layer has a thickness in the range of from about 5 to 8 mil and the outer film layer has a thickness in the range of from about 4 to 6 mil.

According to further embodiments of the present invention, a vehicular window assembly includes a vehicular window panel and an inner film unit. The vehicular window panel has interior and exterior opposed surfaces. The interior surface of the vehicular window panel is formed of polycarbonate and the exterior surface of the vehicular window panel is formed of glass. The inner film unit includes an inner adhesive layer and an inner film layer adhered to the interior surface of the vehicular window panel by the inner adhesive layer.

In some embodiments, the vehicular window panel is mounted in a window opening and the inner film layer is substantially coextensive with the window opening.

According to embodiments of the present invention, a protection system kit is provided for at least one vehicular window panel mounted in a window opening of a vehicle. The kit comprises a film unit supply assembly including a release liner and a multi-layer, self-adhesive film unit. The film unit includes a first film layer and a first adhesive layer releasably securing the first film layer to the release liner. The film unit further includes a second film layer secured to the first film layer on the release liner by a second adhesive layer. The second film layer is selectively removable from the first film layer by peeling the second film layer away from the first film layer. The first adhesive layer is adapted to secure the first film layer to a vehicular window panel in an associated window opening of a vehicle. The first and second film layers are pre-configured to fit the window opening.

In some embodiments, the first and second film layers are pre-configured to be substantially coextensive with the window opening when mounted on the vehicular window panel.

The kit can include a supply of a premixed liquid application solution for use in cleaning and mounting the film unit to the vehicular window panel.

According to embodiments of the present invention, a protection system kit is provided for at least one vehicular window panel mounted in a window opening of a vehicle. The kit includes an inner film unit supply assembly and an outer film unit supply assembly. The inner film unit supply assembly includes an inner release liner and a self-adhesive inner film unit including an inner film layer and an inner adhesive layer releasably securing the inner film layer to the inner release liner. The inner adhesive layer is adapted to secure the inner film layer directly onto an interior surface of the vehicular window panel. The inner film layer is pre-configured to fit the window opening. The outer film unit supply assembly includes an outer release liner and a self-adhesive outer film unit including an outer film layer and an outer adhesive layer releasably securing the outer film layer to the outer release liner. The outer adhesive layer is adapted to secure the outer film layer directly onto an exterior surface of the vehicular window panel. The outer film layer is pre-configured to fit the window opening.

In some embodiments, the inner and outer film layers are pre-configured to be substantially coextensive with the window opening when mounted on the vehicular window panel.

According to some embodiments, at least one of the inner and outer film unit supply assemblies includes a primary film layer releasably secured to the inner or outer release liner, and the inner or outer film layer forms a part of the primary film layer and is defined by at least one score line extending through the primary film layer to the release liner.

The kit may further include a second outer film unit supply assembly including a second outer release liner and a second self-adhesive outer film unit including a second outer film layer and a second outer adhesive layer releasably securing the second outer film layer to the second outer release liner. The second outer adhesive layer is adapted to secure the second outer film layer to the first outer film layer such that the second outer film layer is selectively removable from the first outer film layer by peeling the second outer film layer away from the first outer film layer. The second outer film layer is pre-configured to fit the window opening.

According to some embodiments, the outer film unit supply assembly is a multi-layer unit further including a second outer film layer secured to the first outer film layer on the outer release liner by a second outer adhesive layer, wherein the second outer film layer is selectively removable from the first outer film layer by peeling the second outer film layer away from the first outer film layer.

In some embodiments, the inner film unit supply assembly includes identification indicia thereon indicating that the inner film layer is intended to be mounted on the interior surface of the vehicular window panel, and the outer film unit supply assembly includes identification indicia thereon indicating that the outer film layer is intended to be mounted on the exterior surface of the vehicular window panel.

According to embodiments of the present invention, a protection system kit is provided for at least one vehicular window panel is provided. The kit comprises a film unit supply assembly including a release liner, an adhesive layer on the release liner, and a primary film layer releasably secured to the release liner by the adhesive layer. At least one score line extends through the primary film layer and down to the release liner to define, in the primary film layer: a protection film layer; a supplemental border film layer surrounding the protection film layer; and an outer border film layer surrounding the supplemental border film layer. The adhesive layer is adapted to secure the protection film layer to a vehicular window panel in an associated window opening of a vehicle. The protection film layer is pre-configured to fit the window opening. The supplemental border film layer can be removed from the release liner while retaining the protection film layer on the release liner to facilitate removal of the protection film layer from the release liner without forming tears in the protection film layer.

According to further embodiments of the present invention, a protection system kit for at least one vehicular window panel is provided. The kit comprises a film unit supply assembly including a release liner and a self-adhesive film unit including a protection film layer and an adhesive layer releasably securing the protection film layer to the release liner. The adhesive layer is adapted to secure the protection film layer to a vehicular window panel in an associated window opening of a vehicle. The protection film layer is pre-configured to fit the window opening. The film unit supply assembly includes identification indicia formed into at least one of the release liner and the protection film layer and representing at least one of a prescribed mounting position for the protection film layer, a prescribed type of vehicle for the protection film layer, and a type of the protection film layer.

According to embodiments of the present invention, a method for forming a film unit supply assembly for at least one vehicular window panel comprises: supplying a composite web including a release liner with a first supply film layer releasably adhered thereto by a first adhesive layer and at least one second supply film layer releasably adhered to the first supply film layer by a second adhesive layer; and cutting through the first and second film layers on the release liner in a prescribed pattern to form a protection film unit therein. The first adhesive layer is adapted to secure the protection film unit to a vehicular window panel in an associated window opening of a vehicle when the protection film unit is removed from the release liner. The protection film unit is pre-configured to fit the window opening.

In some embodiments, cutting through the first and second film layers in the prescribed pattern includes programmatically cutting through the first and second film layers in the prescribed pattern using an automated cutting machine.

Cutting through the first and second film layers may include cutting through the release liner.

The method can include providing a scratch resistant coating on a surface of the first supply film layer facing the second supply film layer such that the second adhesive layer releasably engages the scratch resistant coating.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE EMBODIMENTS OF THE INVENTION

Figure 1:
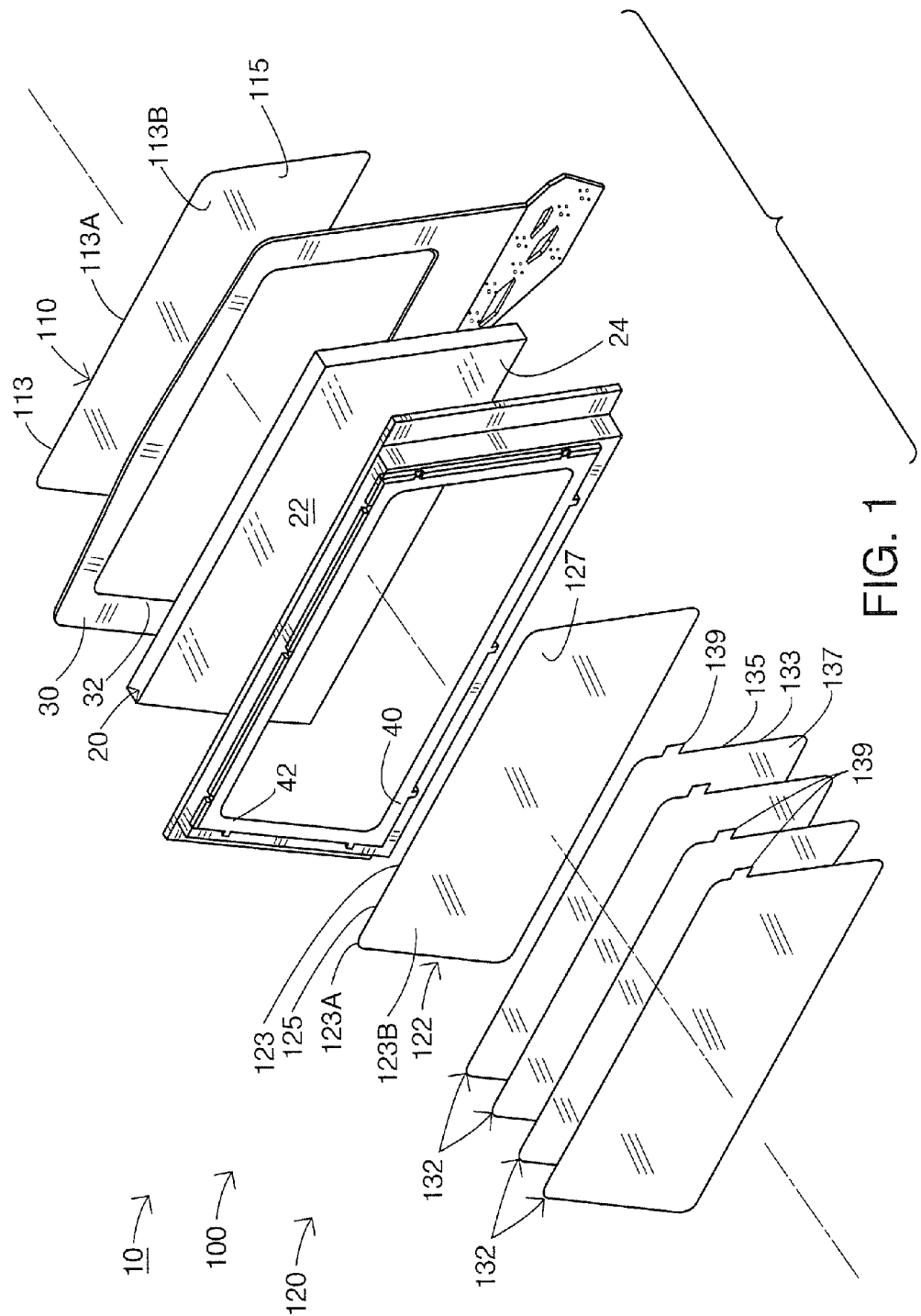
FIG. 1 is an exploded, front perspective view of a protective vehicular window assembly according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein: rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "programmatically" refers to operations directed and/or primarily carried out electronically by computer program modules, code and instructions.

According to embodiments of the present invention, protective film systems and kits for windows and window assemblies and methods using the same are provided. According to some embodiments, the film systems serve as vehicular armaments and include protective films that are applied by wet lamination. Systems of the present invention may be used on tactical or military vehicles such as, for example, the joint light tactical vehicle (JLTV) and the mine resistant ambush protected vehicle (MRAP). The inventive systems may serve to prevent abrasion as well as resist damage from shrapnel in the event of explosions (i.e., from improvised explosive devices (IEDs)). Systems of the present invention may also reduce glare and heat within the vehicle, while causing little or no degradation in the effectiveness of infrared night vision goggles (NVGs).

Figure 2:
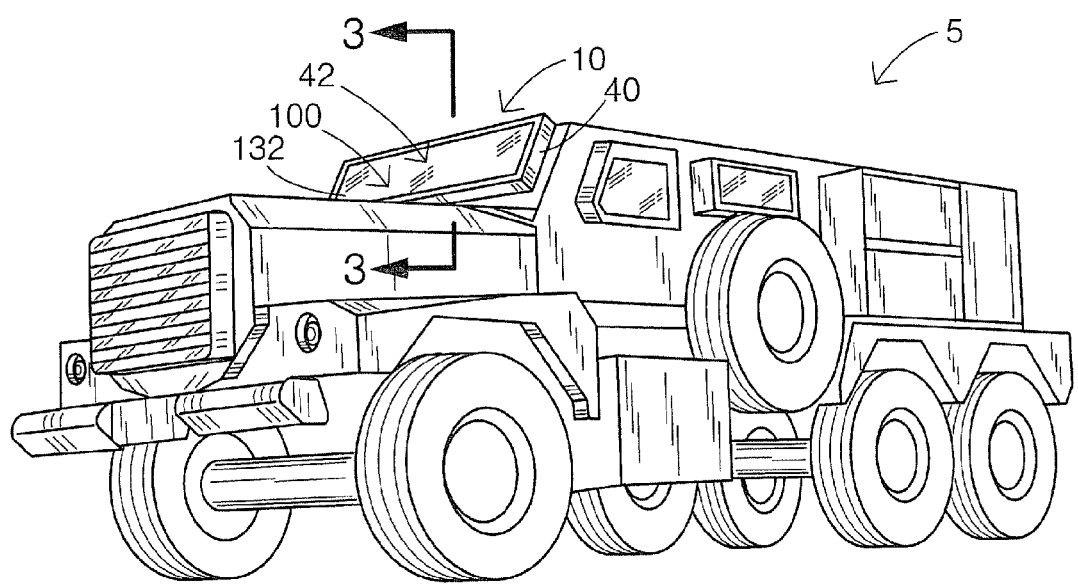
FIG. 2 is a front perspective view of a military vehicle including the window assembly of FIG. 1.

Referring to FIGS. 1-3B, a protective vehicular window assembly 10 according to embodiments of the present invention is shown therein in exploded, perspective view. With reference to FIG. 2, an exemplary military vehicle 5 according to embodiments of the present invention is shown therein including the protective window assembly 10.

The window assembly 10 includes a window panel 20, a barrier member 30, an outer frame 40, and a protective film system 100. The window panel 20, the barrier member 30 and the outer frame 40 may form standard or pre-existing components of a vehicle. The window panel 20, the barrier member 30 and the outer frame 40 may be assembled or preassembled in conventional or any other suitable manner. The barrier member 30 and/or the outer frame 40 may be omitted.

Figure 3:
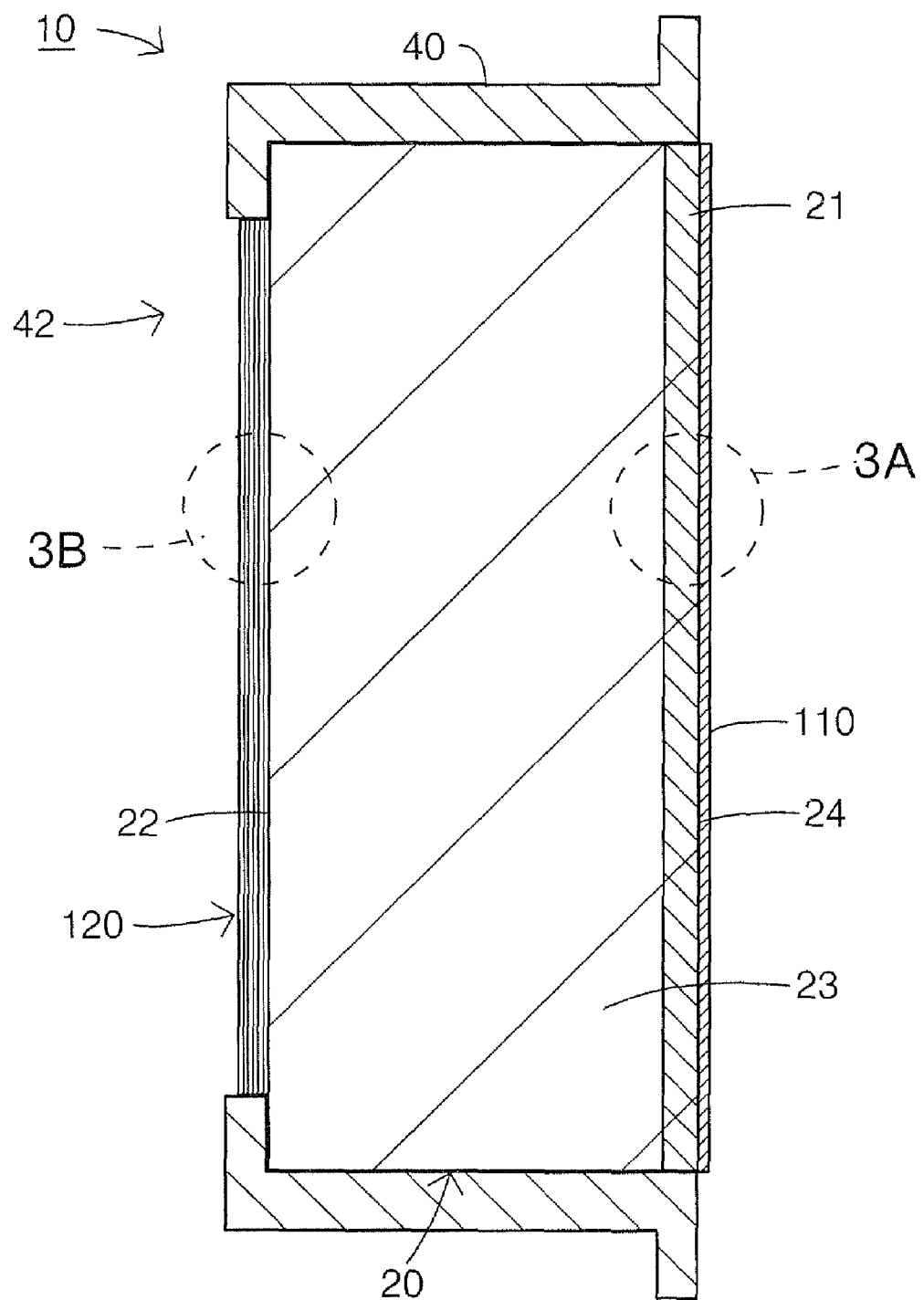
FIG. 3 is a cross-sectional view of the window assembly of FIG. 1 taken along the line 3-3 of FIG. 2.
Figure 3A:
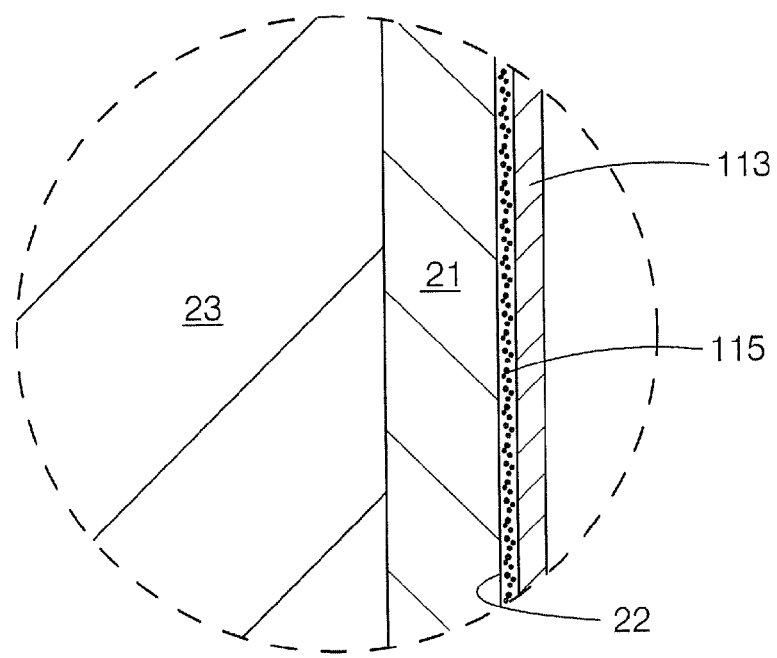
FIG. 3A is an enlarged view of Detail 3A of FIG. 3.
Figure 3B:
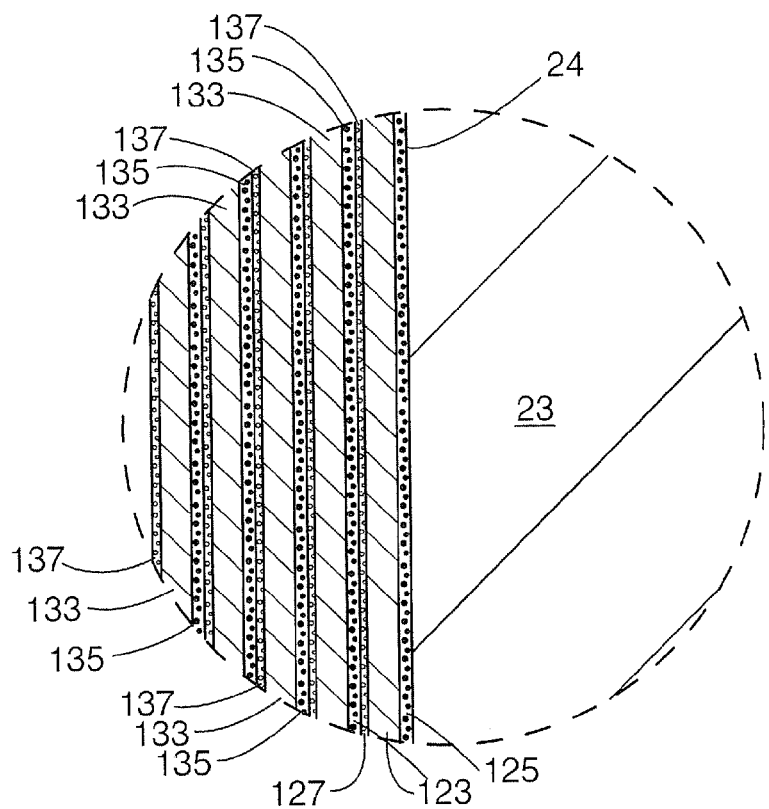
FIG. 3B is an enlarged view of Detail 3B of FIG. 3.

The window panel 20 may be formed of any suitable construction. The window panel 20 has an interior surface 22 and an exterior or impact surface 24. According to some embodiments, the window panel 20 includes a plurality of glass layers laminated to one another with a suitable bonding material (e.g., PVB) interposed between the glass layers. According to some embodiments, the window panel 20 has an overall thickness of between about 2 and 7 inches and, according to some embodiments, between about 3 and 6 inches. According to some embodiments, the interior layer (i.e., the layer including the interior surface 22) is formed of polycarbonate. According to some embodiments and as shown in FIG. 3, the window panel 20 includes a glass outer layer 23 (which may include a plurality of laminated glass layers) and an inner layer 21 formed of a polymeric material and bonded to the inner surface of the glass outer layer 23. According to some embodiments, the inner layer 21 is polycarbonate.

The barrier member 30 defines an opening 32. The barrier member 30 may be formed of a woven, honeycombed fiberglass material. The barrier member 30 may serve as a firewall.

The frame 40 defines an opening 42. The frame 40 may be formed of any suitable material, such as steel.

The protective film system 100 includes an interior film unit 110 and an exterior film assembly 120.

The interior film unit 110 includes a film layer 113 having opposed sides 113A, 113B and a layer of adhesive 115 on the interior side 113B. According to some embodiments, the adhesive 115 coats substantially the entirety of (i.e., is coextensive with) the interior side 113B of the film layer 113. According to some embodiments, the film layer 113 is a multi-ply composite film layer. According to some embodiments, the layers of the film layer 113 are formed of PET that have been permanently pre-laminated using a suitable adhesive or other bonding agent. According to some embodiments, the multiple layers of the film layer 113 are cold laminated. According to some embodiments, the interior film unit 110 has a visible light transmission value of 70% or less, and, according to some embodiments, about 50%. According to some embodiments, the overall thickness of the film unit 110 is between about 5 and 8 mil and, according to some embodiments, is about 7 mil. According to some embodiments, the adhesive 115 is a polycarbonate-friendly adhesive.

The exterior film assembly 120 includes a base film unit 122 and a plurality of (as shown, four) outer film units 132 successively superimposed on the base film unit 122.

The base film unit 122 includes a film layer 123 having opposed sides 123A, 123B. The interior side 123A is coated with an adhesive 125. The exterior side 123B is coated with a scratch resistant hardcoat coating 127. According to some embodiments, the film layer 123 is a single-ply film layer. According to some embodiments, the film layer 123 is formed of PET. According to some embodiments, the overall thickness of the base film unit 122 is between about 4 and 6 mil and, according to some embodiments, is about 5 mil. According to some embodiments, the exterior film unit 122 has a visible light transmission value of at least 90%.

According to some embodiments, each of the outer film units 132 has a film layer 133, an adhesive layer 135 and a scratch resistant coating 137 and is constructed in the same manner as described above for the base film unit 122. However, some or all of the film units 122, 132 may be differently constructed from one another. The outer film units 132 may each include an integral pull tab 139. According to some embodiments, the adhesive 135 of each outer film unit 132 coats substantially the entirety of (i.e., is coextensive with) the interior side 133A except for beneath the pull tab 139. According to some embodiments, the pull tab 139 is also adhesive-backed but the adhesive is deadened or the pull tab 139 is folded back on itself (e.g., at the factory or by the end user) to cover the exposed adhesive.

The exterior film assembly 120 may include any number of the outer film units 132. According to some embodiments, the exterior film assembly 120 includes the base film unit 122 and three to five of the outer film units 132. According to some embodiments, the combined thickness of the exterior film assembly 120 (i.e., the base film unit 122 and all of the outer film units 132 mounted thereon) is in the range of from about 20 to 24 mil.

The system 100 may be used in the following manner to assemble and use the window assembly 10. The interior film unit 110 is mounted on the polycarbonate interior surface 22 of the window panel 20 by means of the adhesive 115. According to some embodiments, the interior film unit 110 is wet laminated onto the inner surface 22.

The base film unit 122 is mounted on the exterior surface 24 of the window panel 20 by means of the adhesive 125. According to some embodiments, the base film unit 122 is wet laminated on the exterior surface 24.

One or more of the outer film units 132 are installed on the window-mounted base film unit 122 or may be pre-installed on the base film unit 122. The exterior film assembly 120 may be provided as a pre-laminated assembly including the outer film units 132 pre-mounted (according to some embodiments, by cold lamination) on the base film unit 122, in which case it is not necessary to separately mount the outer film units 132 on the window panel 20. Alternatively, the base film unit 122 may be provided separately from the outer film units 132. According to some embodiments, the cover film units 132 are pre-cold laminated to one another to form a multi-layer subassembly, in which case the outer film units 132 are cold laminated to the outer surface 123B of the base film unit 122 by means of the adhesive 135 of the innermost outer film unit 132 after the base film unit 122 has been mounted on the window panel 20. According to still further embodiments, the base film unit 122 is applied to the window panel 20 and each outer film unit 132 is individually successively mounted on the preceding film unit 122, 132 (according to some embodiments, by wet laminating). Each pull tab 139 may be folded over on itself (i.e., about a middle fold) so that the adhesive backing the tab 139 is substantially fully enveloped by the film of the tab 139.

In use, the film units 122, 132 serve to protect the window panel 20 and the occupants of the vehicle 5 from abrasion, projectiles and the like. However, in use, the outermost film unit 132 may be subjected to abrasives, which may damage the outermost film unit 132. As a result, the clarity of view through the outermost film unit 132 may be degraded. In this case, the operator may peel the outermost film unit 132 away from the remainder of the exterior film assembly 120, leaving the next outermost film unit 132 or 122 remaining to protect the window panel 20. More particularly, when the last of the outer film units 132 is peeled away, the operator may remount (according to some embodiments, by wet lamination) one or more replacement outer film units 132. These replacement outer film units 132 may also be provided as a multi-layer assembly of multiple outer film units 132.

According to some embodiments, the scratch resistant coatings 127, 137 serve as release coatings to facilitate removal (i.e., peeling) of the outer film units 132 from one another and from the base film unit 122. According to some embodiments, the scratch resistant coatings 127, 137 are each a transparent UV curable hard coat composite. According to some embodiments, the coatings 127, 137 are transparent UV curable acrylic hard coat composites. The scratch resistant coatings 127, 137 may each have a mass weight of about 4.5 gr/m² applied substantially uniformly across the web of film 123, 133. According to some embodiments, each film layer 123, 133 is a PET film layer and the associated film unit 122, 132 has the following surface release characteristics on the front side thereof (i.e., on the scratch resistant coating 127, 137): no scratching with light hand rubbing of #0000 steel wool; maximum 10% removal with Scotch 610 tape; maximum 10% removal with Scotch 600 tape; maximum 10% removal with Scotch 810 tape; and maximum 20% Delta Haze (using CS 10 wheel at 1000 grams load for 100 cycles). In some cases, one or more removals of outer film units 132 from the base film unit 122 may strip away so much of the coating 127 that further removals are difficult or tend to damage the base film unit 122. In this case, the operator may remove the base film unit 122 from the window panel 20 and replace it with a new base film unit 122.

The protective film system 100 may also serve to enhance the integrity of the window panel 20 and/or protect occupants of the vehicle 5 from pieces of the window panel 20 if the window assembly 10 is subjected to an impact sufficient to break the window panel 20. In particular, the exterior and interior film units 122 (and, when present, film(s) 132) and 110 adhere to the glass and polycarbonate of the window panel 20 to hold the shattered pieces in place. Moreover, the film units 110, 122 (and, if present, 132) directly oppose one another on either side of the window panel 20 to envelope and capture the window panel 20 to retain the glass and polycarbonate fragments, thereby preventing or inhibiting the fragments from flying into occupants of the vehicle 5.

According to some embodiments, the protective film system 100 is provided as a pre-combined kit ready to install on the window panel 20. The kit may be suitably packaged in a box or carton, for example. According to some embodiments, the film units 110, 122, 132 are pre-cut to the shape and size ultimately desired (e.g., fitting within the openings 32, 42). The protective film system 100 may be installed in situ on an operative vehicle (e.g., in the field of operation). According to further embodiments, the protective film system 100 is pre-installed on the window panel 20 before the window panel 20 is installed in the vehicle.

Figure 4:
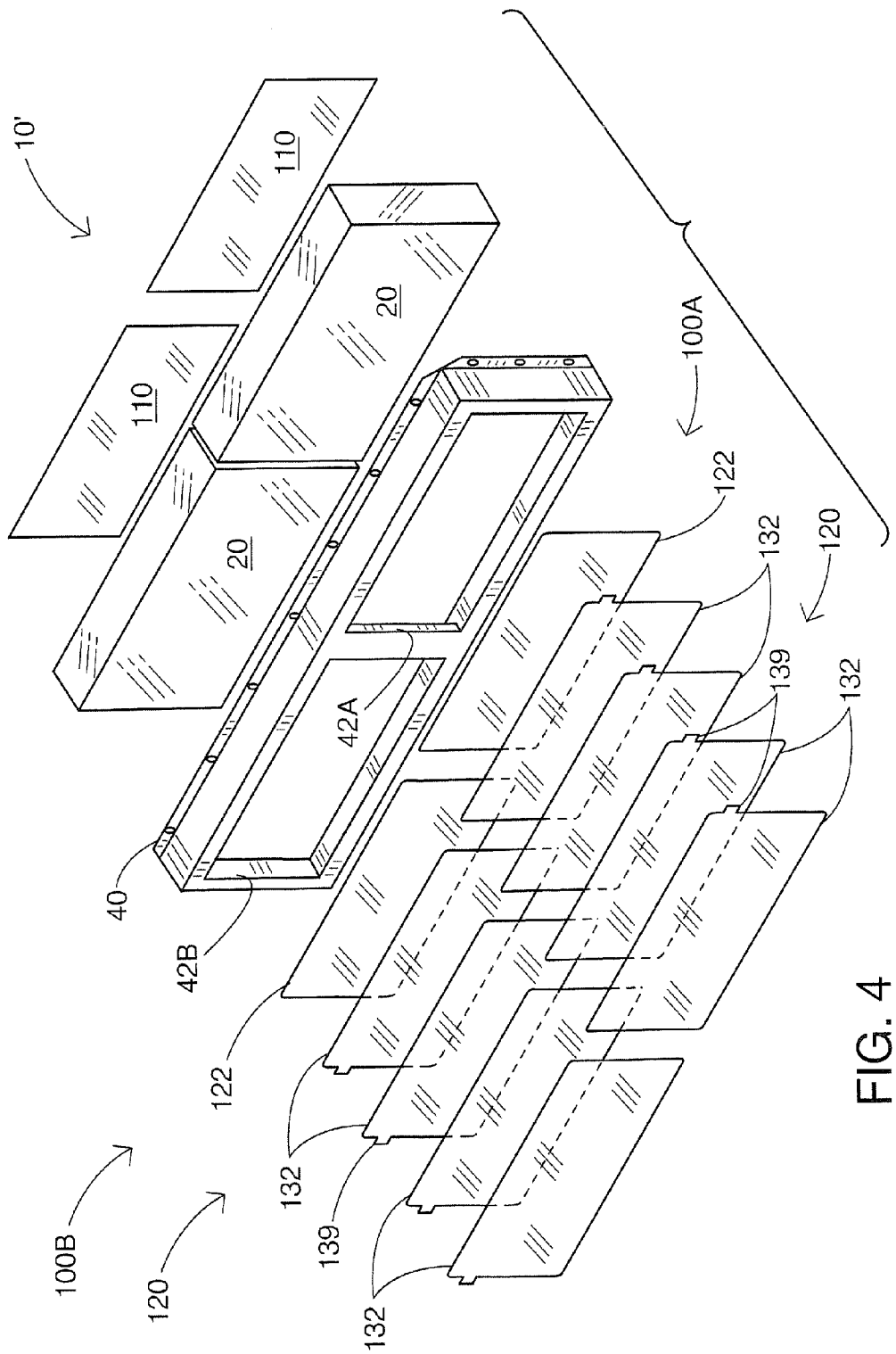
FIG. 4 is an exploded, front perspective view of a protective vehicular window assembly according to further embodiments of the present invention.
Figure 5:
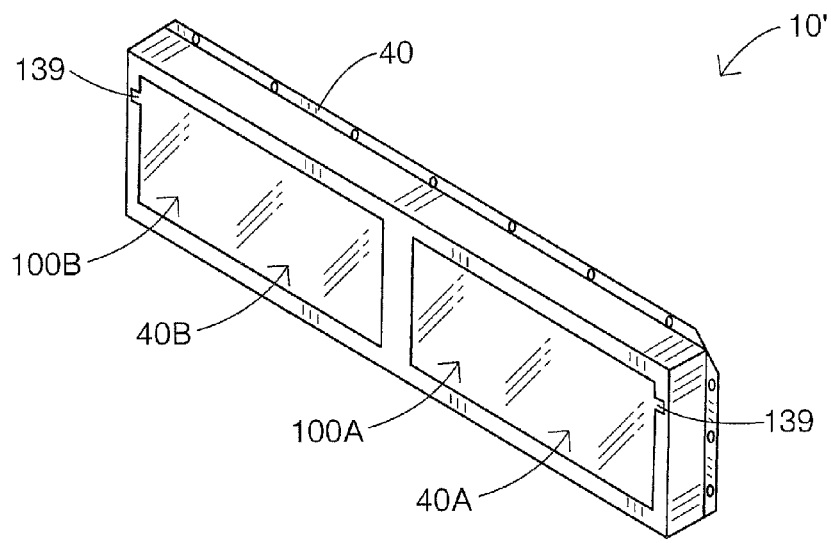
FIG. 5 is a front perspective view of the window assembly of FIG. 4.

FIGS. 4 and 5 show further exemplary embodiments. The embodiments of FIGS. 4 and 5 differ from those of FIGS. 1-3B in that in FIGS. 4 and 5 a dual window panel assembly 10' including two protective film systems 100A, 100B is shown.

In the dual window panel assembly 10', the film systems 100A, 100B may be differently configured from one another. More particularly, the film system 100A is configured to fit the right side window opening 42A and the film system 100B is configured to fit the left side window opening 42B. For example, if the window openings 42A, 42B have different shapes (as defined by their perimeters), the film units 110, 122, 132 will have correspondingly different shapes. The integral pull tabs 139 of the film system 100A are located on the right side edges of the outer film units 132 and the integral pull tabs 139 of the film system 100B are located on the left side edges of the outer film units 132.

According to some embodiments, the film units 110, 120 and/or 132 are pre-cut to the shape and size ultimately desired (e.g., fitting within the openings 32, 42) and each mounted on a release liner to form a film unit supply assembly from which the film unit can be conveniently removed and installed. According to some embodiments, the film unit is pre-cut and pre-configured to fit the prescribed window opening. According to some embodiments, the film unit is pre-cut and pre-configured to be substantially coextensive with the window opening when mounted on the window panel.

Figure 6A:
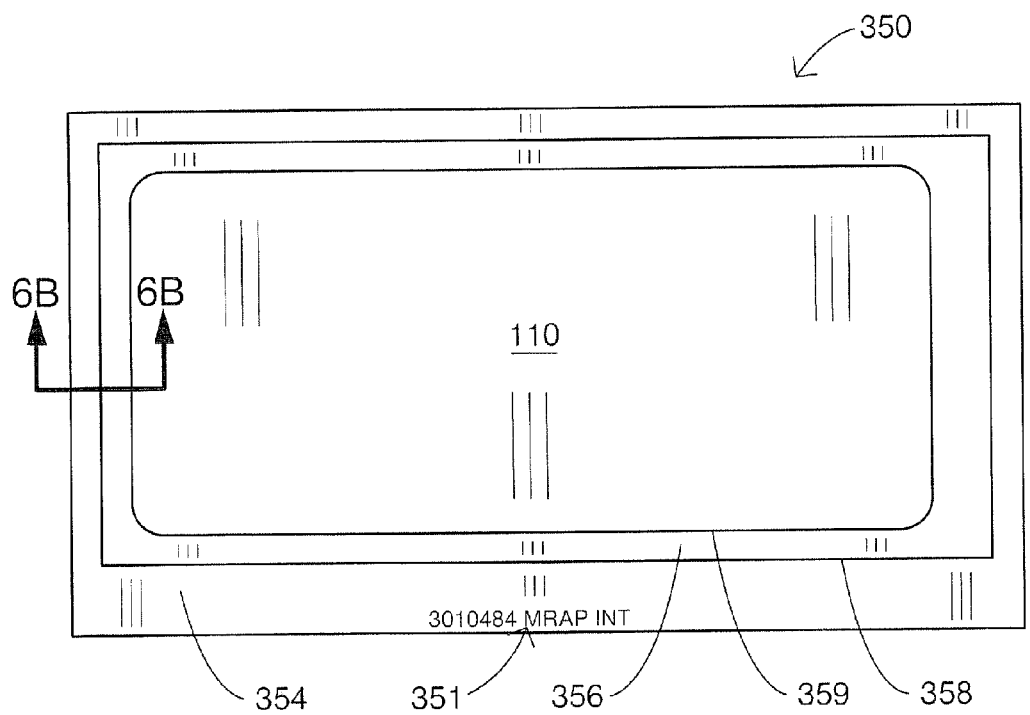
FIG. 6A is a top plan view of an interior film supply unit according to embodiments of the present invention.
Figure 6B:
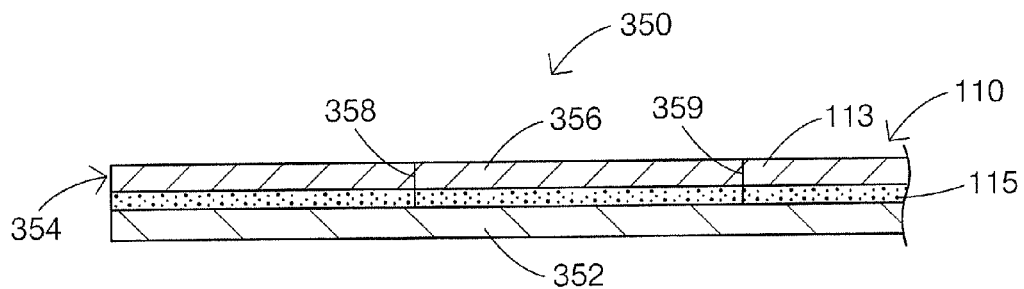
FIG. 6B is a cross-sectional view of the interior film supply unit of FIG. 6A taken along the line 6B-6B of FIG. 6A.

With reference to FIGS. 6A and 6B, an interior film unit supply assembly 350 according to embodiments of the present invention is shown therein. FIG. 6B is a cross-sectional view of the assembly 350 taken along the line 6B-6B of FIG. 6A. The assembly 350 includes a release liner 352 to which a primary film layer 354 is releasably adhered to by the adhesive layer 115. A score line 359 extends through the primary film layer 354 to define the interior film layer 113 within the primary film layer 354. A further score line 358 extends through the primary film layer 354. A supplemental border film layer 356 is defined between the score lines 358, 359. In use, the inner film unit 110 can be peeled away from the release liner 352 and secured to the window panel 20 by the adhesive 115, which remains with the inner film layer 113 to Rani a self-adhesive inner film unit 110. The installer may first remove the supplemental border film layer 356 (which may be referred to as a "weed border") while leaving the inner film layer 113 on the release liner 352. The installer may thereafter remove the inner film layer 113. In this manner, the supplemental border film layer 356 can facilitate removal of the inner film layer 113 from the release liner 352 without forming tears in the inner film layer 113.

Figure 7A:
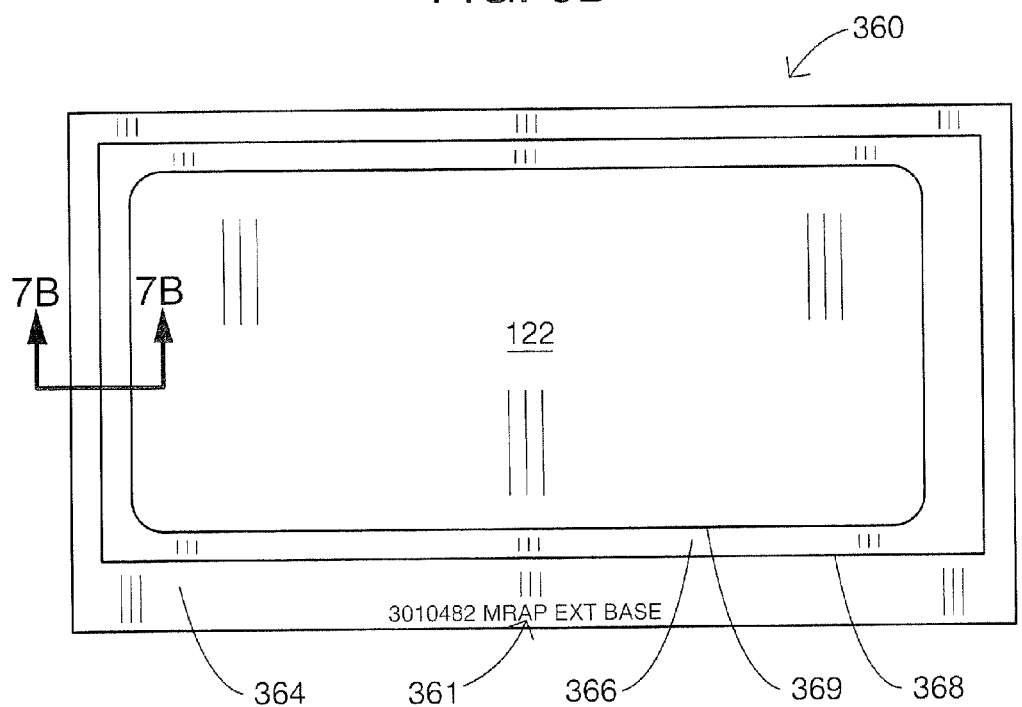
FIG. 7A is a top plan view of a base film unit supply assembly according to embodiments of the present invention.
Figure 7B:
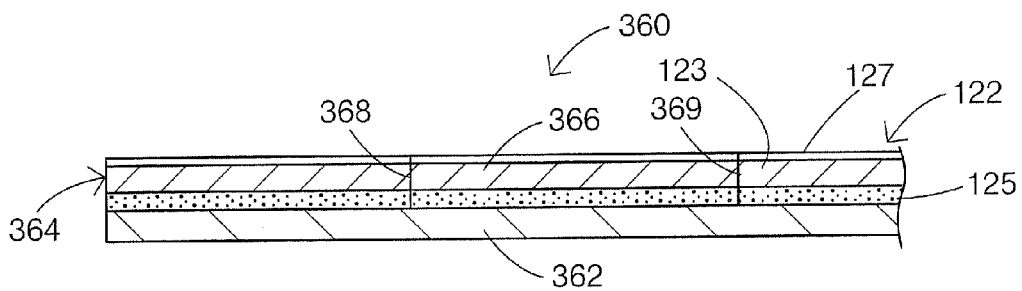
FIG. 7B is a cross-sectional view of the base film unit supply assembly of FIG. 7A taken along the line 7B-7B of FIG. 7A.

With reference to FIGS. 7A and 7B a base film unit supply assembly 360 according to embodiments of the present invention is shown therein. FIG. 7B is a cross-sectional view of the assembly 360 taken along the line 7B-7B of FIG. 7A. The assembly 360 includes a release liner 362 to which a primary film layer 364 is releasably adhered to by the adhesive layer 125. A score line 369 extends through the primary film layer 364 to define the base film layer 123 within the primary film layer 364. A further score line 368 extends through the primary film layer 364. A supplemental border film layer 366 is defined between the score lines 368, 369. In use, the base film unit 122 can be peeled away from the release liner 362 and secured to the window panel 20 by the adhesive 125, which remains with the base film layer 123 to form a self-adhesive base film unit 122. The installer may use the supplemental border film layer 366 to facilitate removal of the base film layer 123 from the release liner 362 in the same manner as discussed above with regard to the supplemental border film layer 356.

Figure 8A:
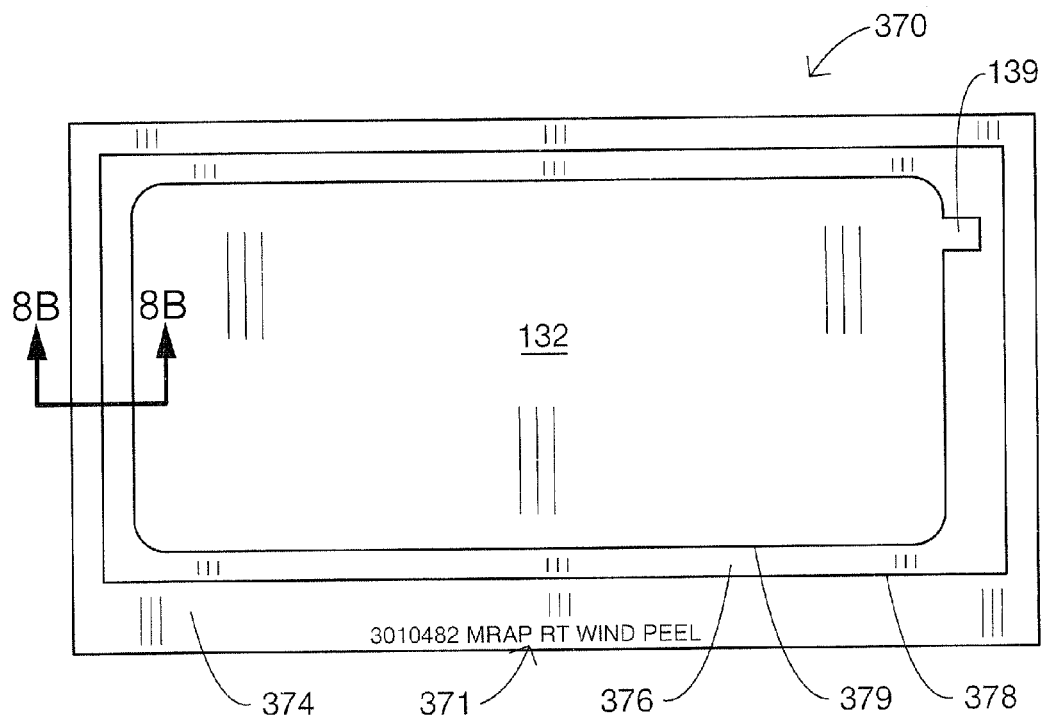
FIG. 8A is a top plan view of a right side outer film unit supply assembly according to embodiments of the present invention.
Figure 8B:
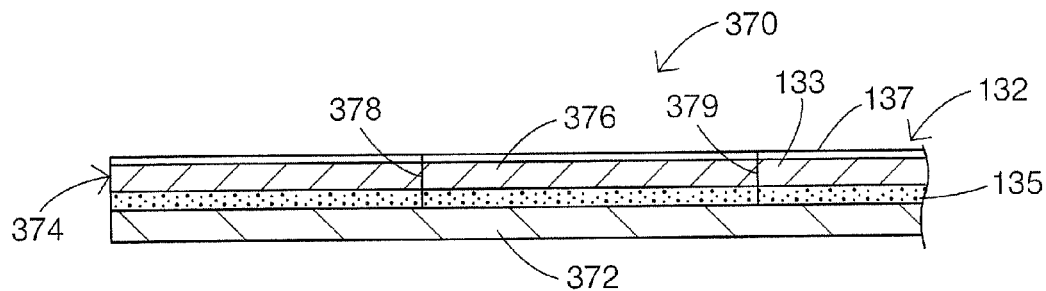
FIG. 8B is a cross-sectional view of the right side outer film unit supply assembly of FIG. 8A taken along the line 8B-8B of FIG. 8A.

With reference to FIGS. 8A and 8B, a right side outer film unit supply assembly 370 according to embodiments of the present invention is shown therein. FIG. 8B is a cross-sectional view of the assembly 370 taken along the line 8B-8B of FIG. 8A. The assembly 370 includes a release liner 372 to which a primary film layer 374 is releasably adhered to by the adhesive layer 135. A score line 379 extends through the primary film layer 374 to define the base film layer 133 within the primary film layer 374. A further score line 378 extends through the primary film layer 374. A supplemental border film layer 376 is defined between the score lines 378, 379. In use, the outer film unit 132 can be peeled away from the release liner 372 and secured to the window panel by the adhesive 135, which remains with the outer film layer 133 to form a self-adhesive outer film unit 132. The installer may use the supplemental border film layer 376 to facilitate removal of the outer film layer 133 from the release liner 372 in the same manner as discussed above with regard to the supplemental border film layer 356.

Figure 9:
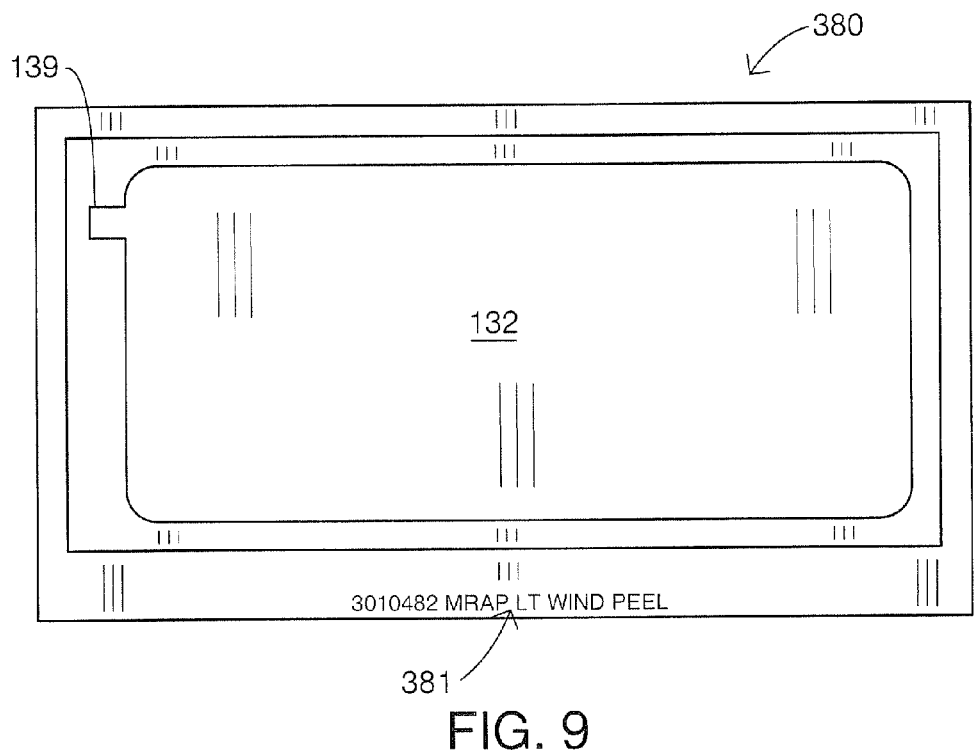
FIG. 9 is a top plan view of a left side outer film unit supply assembly according to embodiments of the present invention.

FIG. 9 shows a left side outer film unit supply assembly 380 according to embodiments of the present invention. The assembly 380 may be formed and used in the same manner as the assembly 370 except for the pattern of the score lines 388, 389, which defines a left side outer film unit 132.

The assemblies 350, 360, 370, 380 may further include indicia 351, 361, 371, 381 thereon. According to some embodiments, the indicia 351, 361, 371, 381 is formed into the primary film layer 354, 364, 374 by embossing, scoring, etching or molding. According to some embodiments, the indicia is formed into the release liner 352, 362, 372. Other methods of providing the indicia may be used as well (e.g., using a self-adhesive label or direct printing). According to some embodiments, the indicia represents a prescribed mounting position for the respective film unit 110, 122, 132 (right side), 132 (left side) (e.g., "LT" to indicate a left side film unit or "RT" to indicate a right side film unit), a prescribed type of vehicle for the film unit (e.g., "MRAP), and/or a prescribed type of film layer (e.g., "INT" to indicate an interior film unit 110, "BASE" to indicate an exterior base film unit 122, or "PEEL" to indicate an outer film unit 132).

Figure 10:
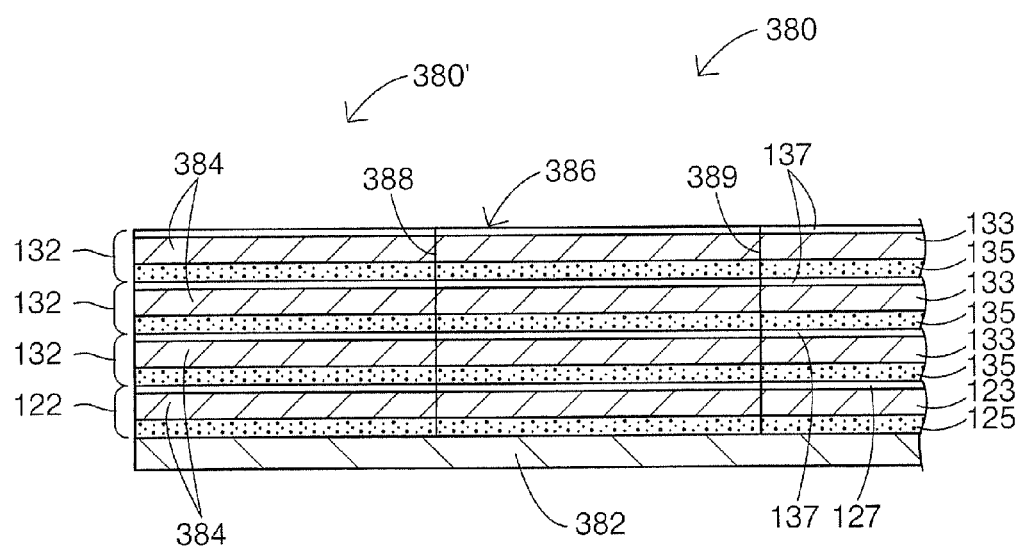
FIG. 10 is an enlarged, fragmentary, cross-sectional view of a multi-layer film unit supply assembly according to further embodiments of the present invention.

With reference to FIG. 10, a multi-layer film unit supply assembly according to further embodiments of the present invention is shown therein. The assembly 380 corresponds to the assembly 360 except that further primary film layers 384 are laminated one on top of the other and cut down to the release liner 382 to form score lines 388, 389 that define a supplemental border strip 386 and a preassembled stack of outer film units 132 and a base unit 122 (collectively, a multi-layer outer film unit 380'). The preassembled stack can be peeled away as a unit from the release liner 382 and installed as a unit onto the window panel 20 using the adhesive layer 125. Alternatively, the base film unit 122 of the preassembled stack may be replaced with an outer film unit 132 and applied to a base unit 122 preinstalled on the window panel 20.

According to some embodiments, the film unit supply assemblies 350, 360, 370, and/or 380 are formed using a method as follows. A release liner is provided with a supply film layer releasably adhered thereto by an adhesive layer. For example, the release liner, the supply film layer and the adhesive layer may be supplied as a prelaminated composite web W. A scoring machine is used to score a prescribed pattern in the supply film layer and down to the release liner to form a prescribed pattern of score lines L in the supply film layer that define the respective film unit 110, 122, 132 in the supply film layer (and, if desired, the supplemental border film layer 356, 366, 376, 386). The release liner may thereafter be cut using any suitable apparatus to form the individual film unit supply assemblies 350, 360, 370, and/or 380. The scoring apparatus or any other suitable apparatus may be used to form the indicia 351, 361, 371. According to some embodiments, the score lines are programmatically and automatically formed.

Figure 11:
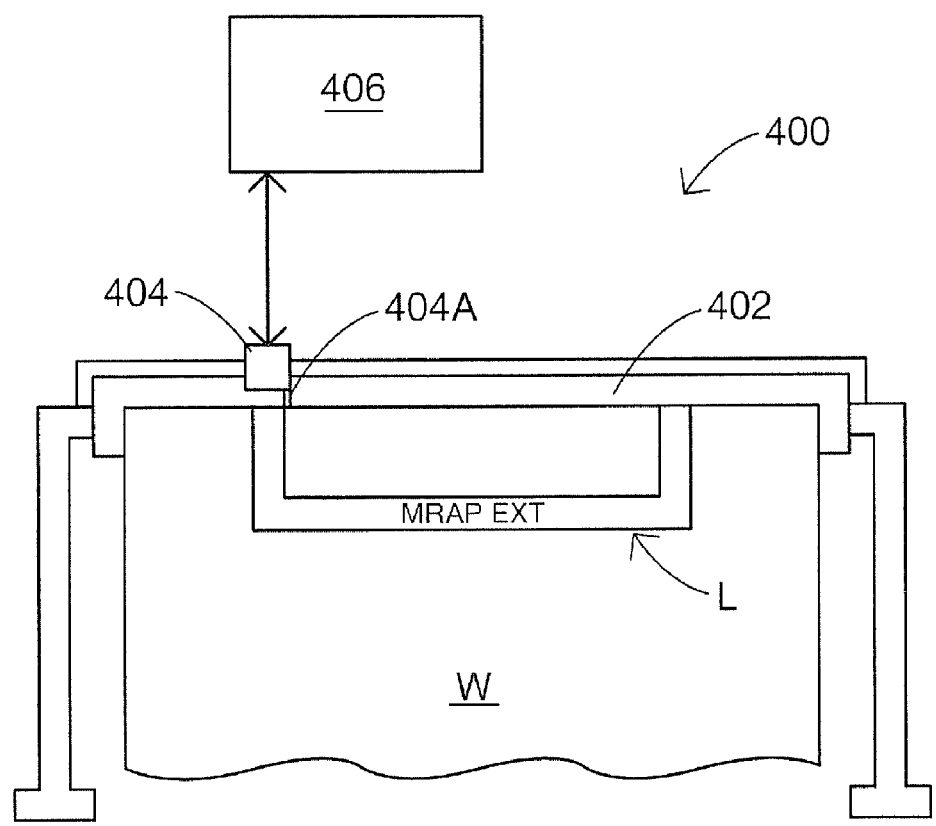
FIG. 11 is a front elevational view of an apparatus according to embodiments of the present invention for forming film unit supply assemblies according to embodiments of the present invention.

An exemplary apparatus 400 according to embodiments of the present invention for manufacturing the film unit supply assemblies as described above is shown in FIG. 11. The apparatus 400 includes a web press 402, a cutting shuttle 404 including a cutting implement 404A (e.g., a blade, ultrasonic cutting head, or thermal cutting head), and a controller 406 (e.g., a suitably programmed PLC or computer). The controller 406 is operably connected to the cutting shuttle 404 to drive the cutting shuttle and/or a web drive with respect to the supply film layer. The controller 406 can be programmed to control the cutting shuttle 404 and/or the web drive to cause the cutting shuttle 404 to form the score lines in the prescribed pattern.

Figure 12:
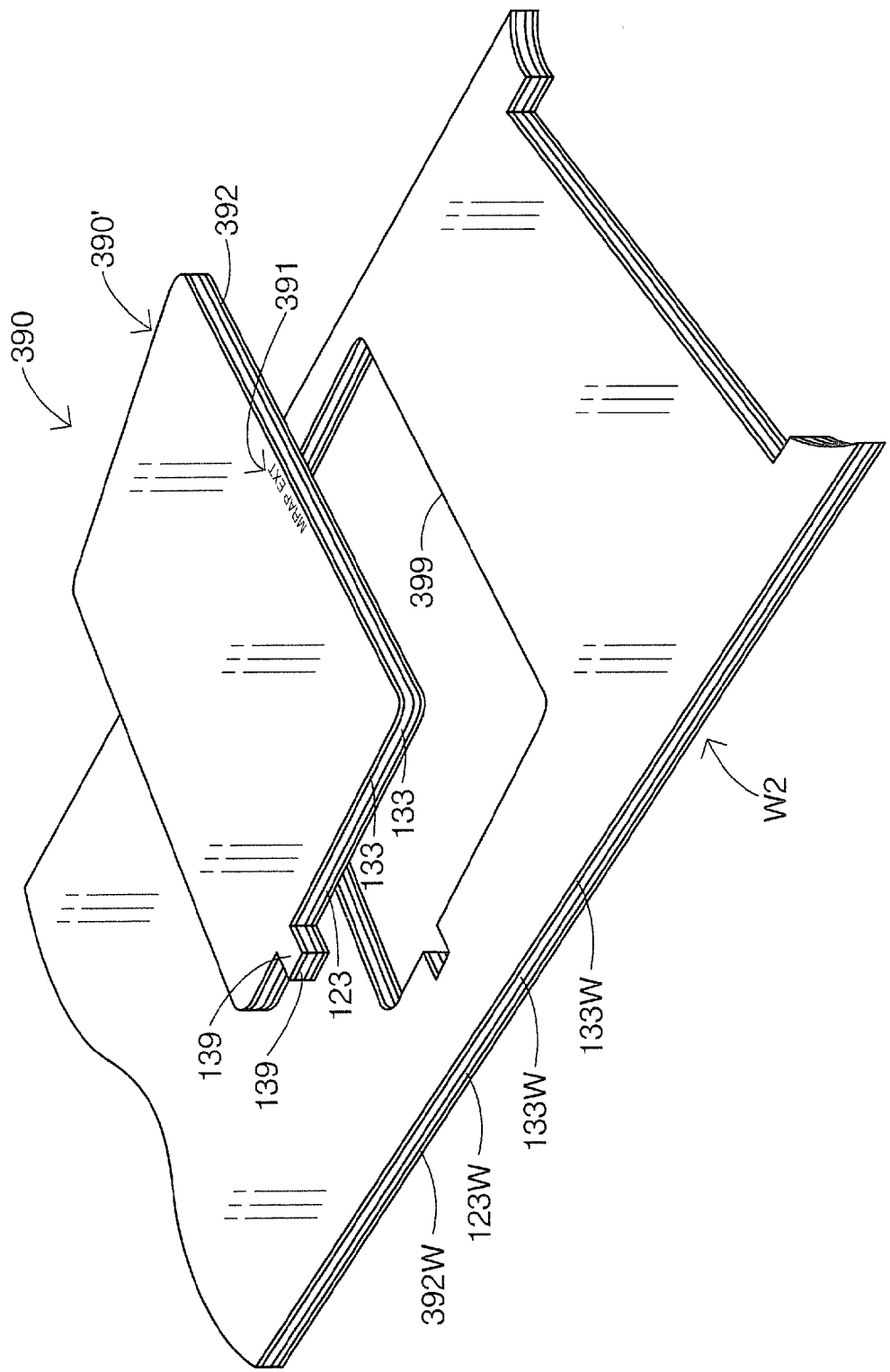
FIG. 12 is a top, exploded view of a composite web and a multi-layer film unit supply assembly according to further embodiments of the present invention.

With reference to FIG. 12, a film unit supply assembly 390 according to further embodiments of the present invention is shown therein removed from a composite web W2 from which the film unit supply assembly 390 has been formed. The assembly 390 is constructed in the same manner as the film unit supply assembly 380 except that the release liner 392 is coextensive with the film layers 123, 133 and the adhesive layers 125, 135 and there are no supplemental border film layers or the like. The assembly 390 can be used in generally the same manner as the assembly 380 by peeling a multi-layer outer film unit 390' (corresponding to the multi-layer outer film unit 380') away from the release liner 392.

The composite web W2 includes a release liner web 392W, a base film web 123W adhered to the release liner web 392W by a base adhesive layer, and an outer film web 133W corresponding to each outer film layer 133 adhered to the underlying film web 123W, 133W by a respective outer adhesive layer (the base and outer adhesive layers are not labeled in the figures). Each film web 123W, 133W may have a scratch resistant coating 127, 137 on its upper surface.

According to some embodiments, the webs 392W, 123W, 133W of the composite web W2 are pre-coated with the scratch resistant coatings 127, 137 and prelaminated to one another to form the composite web W2. According to some embodiments, the layers 392W, 123W, 133W are prelaminated using applied high pressure. According to some embodiments, the layers 392W, 123W, 133W are prelaminated by wet laminating.

The web W2 may be provided as an extended continuous web from which a plurality of the multi-layer film unit supply assemblies 390 are formed. Each assembly 390 may be formed using an apparatus such as the apparatus 400, but wherein the apparatus cuts fully through the release liner layer 390 as well as the layers 123W, 133W. That is, a cut line 399 is formed through the web W2 corresponding to the score line 389 (FIG. 10) except that the cut line 399 continues downwardly through the release liner web 392W. Once cut, the assembly 300 can be removed from the remainder of the web W2 by any suitable technique or mechanism.

According to some embodiments, the cut line 399 is formed in a direction from the topmost film web 133W to the release liner web 392W. According to the embodiments, the cut line 399 is formed in a direction from the release liner web 392W to the topmost film layer 133W.

According to some embodiments, indicia 391 corresponding to the indicia 351, 361, 371, 381 is formed into the topmost layer 133 and/or into the bottom of the release liner 392. The indicia 391 may be formed closely adjacent a peripheral edge or edges of the assembly 390 to prevent or limit intrusion into the line of the sight through the film layer 133.

The pull tabs 139, whether in a single layer film unit supply assembly 350, 360, 370 or in a multi-layer film unit supply assembly 380, 390 can each be lifted or separated from the underlying layer and folded in half to cover the exposed adhesive of the tab 139 while retaining the associated film layer on the release liner and underlying film layer(s) if any. In this manner, the pull tabs 139 can be provided ready for use on the film unit supply assemblies. According to some embodiments, the tabs 139 may be non-adhesive-backed or the adhesive backing the tabs 139 may be deadened.

As discussed above, some or all of the film units 110, 122, 132 may be installed on the window panel 20 by wet laminating. A protective film system kit as disclosed herein may include a supply of a premixed liquid application solution for use in cleaning and mounting the inner film units and base film units to the window panel.

The kit may further include wet laminating implements for hand laminating such as a sprayer and a squeegee. According to some embodiments, the protective film system 100 is installed using the following procedure:

1. Clean the interior and exterior surfaces 22, 24 of the window panel 20 using a cleaning liquid. The premixed application solution may be used for this purpose.

2. Remove the cleaning liquid from the surfaces 22, 24 using a squeegee.

3. Spray the interior surface 22 with the application solution.

4. Peel the border 356 away from the release liner 352 and thereafter peel the interior film unit 110 away from the release liner 352. Spray the adhesive-side of the film unit 110 with the application solution (e.g., as the film unit 110 is being peeled away from the release liner 352).

5. Lay the wetted film unit 110 on the interior surface 22.

6. Spray the application solution onto the outer side of the film unit 110.

7. Squeegee the film unit 110 on the interior surface 22 to force excess application liquid out from between the interior surface 22 and the film unit 110.

8. Prepare the exterior surface 24 of the window panel 20 in the same manner as described for the interior surface 22.

9. Apply the base film unit 122 to the exterior surface 24 in the same manner as described above for the interior film unit 110.

10. Apply the first outer film unit 132 to the base film unit 122 in the same manner as described above for the interior film unit 110.

In the event a multi-layer outer film unit supply assembly 380, 390 is used, the multi-layer outer film unit 380', 390' can be installed in the same manner as the base film unit 122 (if the film unit 380', 390' is being installed directly on the window surface 24) or an outer film unit 132 (if the film unit 380', 390' is being installed on the base film unit 122 or a pre-installed outer film unit 132.

Protective film systems and methods according to embodiments of the invention can package high performance film technology such that it can be expediently applied in the field by military personnel of various backgrounds and skill levels. Embodiments of the invention can address the inherent and substantial difficulties in applying films of this type, particularly difficulties in cutting and fitting micro thin films to the various windows of military vehicles. Programmatic (e.g., digitized) patterning of the protective film layers and indexing of the film units to prescribed window configurations can eliminate or reduce each of these problems away and enable easy and expedient installation of the protective film layers on both the exterior and interior window surfaces (which may be glass and polycarbonate surfaces, respectively).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

We claim:

1. A vehicular window assembly comprising:
    a vehicular window panel having an interior surface formed of polycarbonate and an opposed exterior surface formed of glass;
    an inner film unit including an inner adhesive layer and an inner film layer adhered to the interior surface of the vehicular window panel by the inner adhesive layer;
    a first outer film unit including a first outer adhesive layer and a first outer film layer adhered to the exterior surface of the vehicular window panel by the first outer adhesive layer; and
    a second outer film unit including a second outer adhesive layer and a second outer film layer adhered to the first outer film layer by the second outer adhesive layer and selectively removable from the vehicular window panel by peeling the second outer film layer away from the first outer film layer;
    wherein the inner film unit has a thickness in the range of from about 5 to 8 mil and the first outer film unit has a thickness in the range of from about 4 to 6 mil.

2. The vehicular window assembly of claim 1 wherein the vehicular window panel is mounted in a window opening of a vehicle and the inner and first and second outer film layers are each substantially coextensive with the window opening.

3. The vehicular window assembly of claim 1 wherein the vehicular window panel forms a part of a military vehicle.

4. The vehicular window assembly of claim 1 wherein the second outer film layer includes a main section configured to cover the vehicular window panel and a pull tab integrally formed with the main section.

5. The vehicular window assembly of claim 1 including a scratch resistant coating on the first outer film layer between the first outer film layer and the second outer adhesive layer.

6. The vehicular window assembly of claim 1 wherein the inner film layer is formed of PET.

7. The vehicular window assembly of claim 1 wherein the outer film layer is formed of PET.

8. The vehicular window assembly of claim 1 wherein:
    the vehicular window panel forms a part of a military vehicle;
    the vehicular window panel is mounted in a window opening of the military vehicle and the inner and first and second outer film layers are each substantially coextensive with the window opening;
    the second outer film layer includes a main section configured to cover the vehicular window panel and a pull tab integrally formed with the main section;
    the vehicular window assembly includes a scratch resistant coating on the first outer film layer between the first outer film layer and the second outer adhesive layer;
    the inner film layer is formed of PET; and
    the outer film layer is formed of PET.

* * * * *